Patented Feb. 4, 1941

2,230,351

UNITED STATES PATENT OFFICE 2,230,351

HALOGENATED CASTOR OIL-POLYCARBOXYLIC ACID PRODUCTS

Arthur Hill, Blackley, Manchester, England, assignor to Imperial Chemical Industries Limited, a corporation of Great Britain No Drawing. Application July 6, 1938, Serial No. 217,775. In Great Britain July 13, 1937

9 Claims. (Cl. 260—22)

This invention relates to synthetic resin compositions.

This invention has as an object to provide new synthetic resin compositions. A further object is to provide new viscous substances which are compatible with film forming materials and are capable of imparting flame proof properties to films into which they have been introduced. A further object is to provide substances which possess valuable plasticising properties. A still further object is to devise methods of manufacturing such synthetic resins and substances having the properties mentioned above. Further objects will appear hereinafter.

These objects are accomplished by the following invention. I have found that I can obtain viscous substances which are compatible with film forming materials and both plasticise and impart flame resistant qualities to the film forming substances if I halogenate the viscous or plastic substances obtained by reacting castor oil with polybasic acids, or with the anhydrides of such acids, or with the acids or anhydrides of such acids and polyhydric alcohols.

According to the invention, the castor oil reaction product is dissolved in a suitable solvent such as tetrachloroethane, carbon tetrachloride, benzene or toluene and is subjected to the action of a halogen, in particular chlorine or bromine. In general I prefer to use bromine as being more effective in producing the desired flameproof properties in the final coating composition. The amount of halogen introduced is between 5% and 25%, preferably between 10% and 20% on the weight of the castor oil reaction product.

The invention is illustrated but not limited by the following examples in which the parts are by weight.

Example 1

750 parts of a castor oil-maleic acid condensation product are dissolved in 750 parts of carbon tetrachloride and the solution is cooled to 10°–15° C. 564 parts of a 20% solution of bromine in carbon tetrachloride are then added slowly during about 1½ to 2 hours keeping the temperature at 10°–15° C. After stirring for a short time at 10°–15° C. the mixture is heated on a water bath until carbon tetrachloride ceases to distil off. A very viscous brownish oil is thus obtained.

The condensation product of castor oil and maleic acid used is prepared by heating 1395 parts of castor oil with 261 parts of maleic acid in a stream of inert gas to a temperature of 175°–180° C. for about 4½ hours. It is a yellow oil having an acid value of about 56 milligrams KOH per gm. and a viscosity of 200–250 poises at 20° C.

Example 2

913 parts of a castor oil-citric acid condensation product are dissolved in 450 parts of toluene and the solution is cooled to 0°–5° C. 137 parts of bromine are then added slowly during about 1½–2 hours, the temperature being maintained at 0°–5° C. The mixture is then stirred for a further 1 hour at 0°–5° C. and is then allowed to warm up to room temperature. There is thus obtained a 68%–70% solution of the brominated condensation product in toluene which may be used as such in making up coating compositions.

The castor oil-citric acid condensation product used in this example is prepared by heating 114.5 parts of castor oil with 20.5 parts of citric acid in a stream of inert gas, e. g., carbon dioxide, to a temperature of 170–172° C. for about 2½ hours. There is thus obtained a viscous yellow oil having an acid value of 58–62 mg. KOH per gram and a viscosity of 400–600 poises at 20° C.

Benzene may be used in place of toluene in this example. In this case the bromination is carried out at slightly higher temperature, e. g. 5°–10° C. to avoid difficulties in manipulation due to the benzene freezing on the walls of the vessel.

Example 3

450 parts of the castor oil-citric acid condensation product used in Example 2 are dissolved in 150 parts of benzene and the solution is cooled to 5° C. 90 parts of bromine are then added slowly during 2 hours keeping the temperature at 5°–8° C. After stirring for a further 2 hours at 5°–8° C. the mixture is allowed to warm up to room temperature. There is thus obtained a 76–78% solution of the brominated condensation product in benzene which may be used as such in the making of flame-proof coating compositions. Alternatively, if so desired, the benzene may be removed by distillation and the very viscous residue which remains may be used in place of the solution.

Example 4

500 parts of the castor oil-citric acid condensation product used in Example 2 are dissolved in 230 parts of benzene. The solution is cooled to 8° C. and maintained at a temperature of 8° C.–12° C. whilst a stream of chlorine is passed in until there is obtained an increase in weight of 26 parts. There is thus obtained a pale yellow viscous solution which may be used as such in the making of flame-proof compositions.

If the chlorination is continued until the increase in weight is 63 parts, the product is more efficient in imparting flame-proof properties, but is more viscous and on standing tends to slowly evolve hydrochloric acid gas.

Example 5

490 parts of a castor oil-modified alkyd resin (prepared as described below) and 210 parts of benzene are mixed and stirred until a homogeneous solution is obtained. The solution is then cooled to 5° C. and 73.5 parts of bromine are added during 1½–2 hours, the temperature being kept below 10° C. during the addition. The solution is stirred for a further ½ hour at 5–10° C. and is then allowed to warm up to room temperature; it is then a pale brown viscous liquid.

The castor oil-modified alkyd resin used in this example is prepared as follows:

420 parts of castor oil are mixed with 82 parts of glycerol and 2 parts of "sodium glycerate" catalyst (prepared by dissolving 5 parts of caustic soda in 5 parts of water and adding 90 parts of glycerol) are added. The mixture is stirred and heated to 220–225° C. until it is homogeneous (about 1 hour), a steady stream of carbon dioxide being passed through the vessel in which it is contained so as to expel the air from the reaction zone. When the mixture is homogeneous it is cooled to 120° C. 198 parts of phthalic anhydride are now added and the mixture is heated for 4½ hours at 185°–205° C. in a stream of carbon dioxide. The product now has an acid value of 12–15 and is suitable for making a halogenated derivative as previously described.

Example 6

200 parts of the castor oil modified alkyd resin used in Example 5 are dissolved in 150 parts carbon tetrachloride. The solution is cooled to 10°–15° C. and 20 parts bromine are then added, the temperature being maintained at 10°–15° C. by external cooling. The mixture is then stirred for a short time at 10°–15° C. and is then allowed to warm up to the room temperature. A viscous brown solution results which may be used as such in coating compositions or the solvent may first be removed by distillation.

Example 7

200 parts of the castor oil modified alkyd resin used in Example 5, are dissolved in 200 parts carbon tetrachloride and a stream of chlorine is passed into the solution until there is obtained an increase in weight of 10 parts. A yellow viscous solution is obtained which can be used as such in coating compositions.

Example 8

200 parts of a castor oil modified glyceryl adipate resin, prepared as described below, are dissolved in 100 parts toluene, the solution is cooled to 5°–10° C. and 40 parts bromine are then added, the temperature being maintained at 5°–10° C. by external cooling. The mixture is stirred for a further 1 hour at 5°–10° C. and is then allowed to warm up to the room temperature. The product is a viscous brown solution.

The castor oil modified glyceryl adipate used in this example is prepared as follows.

270 parts castor oil are mixed with 67 parts glycerol and heated in an atmosphere of carbon dioxide to a temperature of 200° C. A mixture of 0.2 part litharge in 5 parts castor oil is then added and the temperature is raised to 220°–225° C. After ½ hour the then clear homogeneous mixture is allowed to cool somewhat and 158 parts adipic acid are added. The mixture is then heated at 195°–200° C. until the acid value falls to 15–17 mg. KOH per gm. This takes about 5 hours. The product is a pale yellow very viscous oil of about 500–600 poises viscosity at 20° C.

Example 9

300 parts castor oil modified glycol maleate, prepared as described below, are dissolved in 150 parts benzene and the solution cooled to 5°–10° C. 15 parts bromine are then added during about ½ hour, the temperature being maintained at 5°–10° C. by external cooling. The mixture is stirred for a further 1 hour at 5°–10° C. and is then allowed to warm up to the room temperature.

The castor oil modified glycol maleate used in this example is prepared as follows:

250 parts castor oil, 87 parts ethylene glycol and 163 parts maleic acid are mixed and heated to 160°–165° C. in an atmosphere of carbon dioxide for 7½ hours. The acid value is then 40–42 mg. KOH per gm. and the product on cooling is a yellow oil of about 120–150 poises viscosity.

Suitable polybasic carboxylic acid reaction products with castor oil are those obtained by interaction between castor oil and the following acids and their anhydrides: phthalic, isophthalic, terephthalic, hexahydrophthalic, succinic, adipic, glutaric, azelaic, suberic, maleic, fumaric, citric or aconitic acid. These reaction products may be prepared by heating castor oil with about one equivalent or less of the polybasic carboxylic acid to a temperature between 140° and 260° C., the selected temperature depending upon the nature and amount of polybasic carboxylic acid used. By one equivalent of polybasic carboxylic acid is meant that quantity required, on a stoichiometric reckoning, to react with the hydroxyl groups of the castor oil. It is preferable to use less than the equivalent (e. g. about 0.3 to 1.0 equivalent) of polybasic carboxylic acid as otherwise the reaction mixture tends to give an insoluble mass (i. e. "gelation" takes place), although it still has a relatively high acid value. The duration of the heating depends on the amount and nature of the polybasic carboxylic acid used and is best determined by trial according to the properties of viscosity and acid value desired.

Suitable reaction products of castor oil polybasic acids or their anhydrides and polyhydric alcohols, herein referred to as castor oil-modified alkyd resins may be prepared for instance by heating a polybasic acid or its anhydride, e. g. phthalic anhydride, with a polyhydric alcohol, e. g. glycerol, and castor oil until the desired degree of condensation has been effected, or by heating castor oil with a polyhydric alcohol, e. g. glycerol, in the presence of an "alcoholysis" catalyst, e. g. litharge or sodium glycerate, until a homogeneous reaction mixture is obtained and thereafter adding a polybasic acid or its anhydride, e. g. phthalic anhydride, and continuing the heating until the desired degree of condensation has been effected. Such processes are described, for example, in British Specifications Nos. 22,544 of 1913 and 344,401 and in U. S. Patent No. 2,074,509.

In the preparation of the castor oil modified alkyd resin, instead of glycerol, other polyhydric alcohols may be used, such as, for example, ethylene glycol, erythritol, mannitol, arabitol, xylitol and adonitol.

As many apparently widely different embodiments of this invention may be made without departing from the spirit and scope thereof, it is to be understood that the invention is not limited to the specific embodiments thereof, except as defined in the appended claims.

I claim:

1. The process for the manufacture of a flame-resistant plasticizer which comprises treating the reaction product, obtained by reacting castor oil and a polycarboxylic acid, with a free halogen until an increase of 5 to 25% by weight is obtained.

2. The process of claim 1 in which the polycarboxylic acid is in the form of an anhydride.

3. Process of claim 1 in which the halogen is chlorine.

4. Process of claim 1 in which the halogen is bromine.

5. Process of claim 1 in which the said reaction product is obtained by reacting castor oil, a polycarboxylic acid, and a polyhydric alcohol.

6. A plasticizer capable of imparting flame-resistant properties to a coating composition which comprises the reaction product of castor oil and a polycarboxylic acid which has been treated with a free halogen until an increase in weight of the said reaction product is between 5 to 25% due to the addition of the said halogen.

7. The product of claim 6 in which the reaction product is obtained by heating castor oil, a polycarboxylic anhydride, and a polyhydric alcohol.

8. The product of claim 6 in which the halogen is chlorine.

9. The product of claim 6 in which the halogen is bromine.

ARTHUR HILL.